United States Patent [11] 3,557,748

| | | | |
|---|---|---|---|
| [72] | Inventor | Hoel L. Bowditch | |
| | | Foxboro, Mass. | |
| [21] | Appl. No. | 772,683 | |
| [22] | Filed | Nov. 1, 1968 | |
| [45] | Patented | Jan. 26, 1971 | |
| [73] | Assignee | The Foxboro Company | |
| | | Foxboro, Mass. | |
| | | a corporation of Massachusetts | |

[54] INSTRUMENT INDICATOR SCALE ASSEMBLY
1 Claim, 5 Drawing Figs.

[52] U.S. Cl. ................................................... 116/129,
40/16; 58/127; 116/124; 324/115
[51] Int. Cl. ..................................................... G09f 9/00
[50] Field of Search ........................................ 116/129,
124.1, 124.2, 124, 135; 40/16, 16.2, 16.4, 16.6,
64, 156, 158, 133B, 63, 159; 33/149A; 58/127,
(Inquired); 324/115, 154, 155, 156; 73/431, 408,
432; 177/(Inquired)

[56] References Cited
UNITED STATES PATENTS

| 1,314,610 | 9/1919 | Smith et al.................. | 324/115 |
|---|---|---|---|
| 1,378,983 | 5/1921 | Smith........................... | 324/115X |
| 1,801,878 | 4/1931 | Petersen....................... | 73/492 |
| 1,857,367 | 5/1932 | Ellison......................... | 116/129UX |
| 2,090,160 | 8/1937 | Spitzglass et al............. | 73/408 |
| 2,132,051 | 10/1938 | Schuttenberg................ | 40/63 |
| 2,476,315 | 7/1949 | Morrison...................... | 116/129X |
| 2,550,936 | 5/1951 | Poirette........................ | 324/115 |
| 2,836,793 | 5/1958 | Kelly............................ | 324/115 |

FOREIGN PATENTS

| 1,151,415 | 8/1957 | France......................... | 324/115 |

*Primary Examiner*—Louis J. Capozi
*Attorney*—Lawrence H. Poeton

ABSTRACT: For use in process and/or energy control instrumentation, an indicator assembly with special construction for quick and simple assembly, disassembly, or interchange of indicia scales. With a variety of indicia presentations, scales may be so precisely interchanged as to require no recalibration in selected families of parameters for indication in such an assembly.

PATENTED JAN 26 1971

INVENTOR
HOEL T. BOWDITCH
BY
Lawrence H. Poeton
AGENT ns to instrumentation for process and/or
energy control, and has particular reference to indicator
systems and structures for such instrumentation.

In modern instrumentation there is need for indicator structures of simplicity, versatility, and interchangeability.

This invention provides these advantages by using an assembly of a main body, a windowed cover, and means for receiving a flexible indicator strip and bending and holding this strip in curvature which is compatible with the operating curve of pivoted pointer means arranged to move along the scale in accordance with the changing values of the indicated parameter or condition situation.

The entire assembly of this invention is of simple, rugged structure, easily put together or taken apart. Various scales are interchangeable, and in systems combinations, this can be done without recalibration. A backing strip is provided for the indicator scale, and this supports a warning light assembly and includes a hinged cover which is used for access to the indicator strip. The backing strip itself is readily removable, cover and all. Curved channels formed by mutually facing shoulders on different parts of the structure housing provide curvature in an ordinarily straight flat indicator scale strip as needed to match the arc of movement of a pivoted indicator pointer.

Other objects and advantages of this invention will be in part apparent and in part pointed out hereinafter and in the accompanying drawings, wherein.

Figure 1:
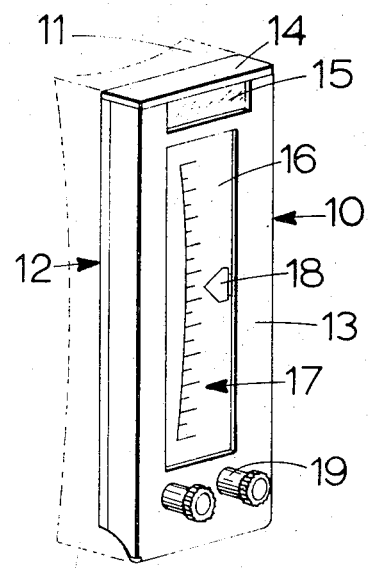
FIG. 1 is a perspective view of an indicator assembly according to this invention.

In FIG. 1, an assembled indicator unit according to this invention is indicated generally by the arrow 10. It is preferably vertically rectangular and is, as a body, the front panel of an instrument 11, shown partially and in dotted lines. This indicator unit is narrow and simply designed to meet modern needs for smaller yet readily visible instrument faces. Thus in present day grouping of many instruments to service complex process or energy systems, the present indicator unit is a useful and integral part.

The indicator unit 10 comprises a body portion 12 shown in FIG. 1 only by an edge, a front cover 13 which abuts on the body edge, and a top cover 14. The front cover 13 has a top panel window 15 across the top for viewing alarm lights within the unit. A vertically rectangular window 16 through which a vertical indicator scale 17 may be seen is shown with one indicating pointer 18 and with the scale. Various pointers or combinations thereof may be used, and as will be seen hereinafter, they move vertically up and down the indicator scale, on an arc determined by the support arm for the pointer, as pivoted in the instrument 11. Various adjustment knobs may be provided, as indicated at 19 at the bottom of the unit.

Figure 2:
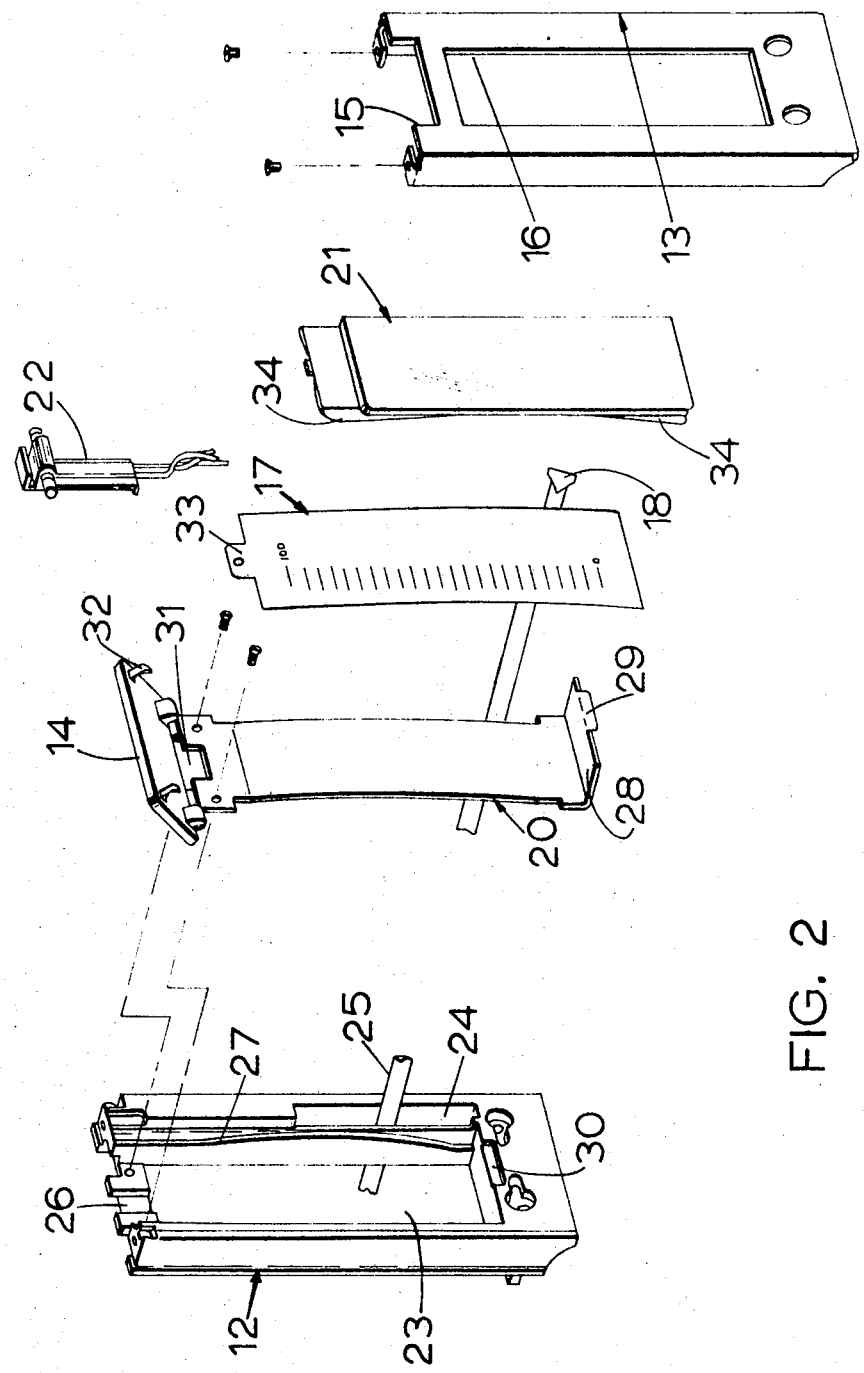
FIG. 2 is an exploded view of the assembly structure of FIG. 1.

As exploded in FIG. 2, the indicator unit comprises the body 12, a backing strip 20 with the cover 14 thereon, an indicator scale 17, shown unbent, a viewing lens 21, and the front cover 13. An alarm light assembly 22 is shown as to be mounted through the top of the backing strip 20 and at the top of the body 12.

The body 12 has a central rectangular opening 23 therethrough, and a side opening 24 through which one or more indicator pointer arms 25 may enter and move vertically within the unit. A vertical slot 26 in the top crossbar of the body is used to mount the alarm light unit 22. On each side of the body 12 and within the main opening 23, a forward facing strip shoulder 27 is formed in a forwardly convex curve to seat the similarly curved backing strip 20, and as one side of the channels for receiving and curving the flexible scale strip 17.

The backing strip 20 is curved to abut and follow the strip shoulders 27 of the body 12. A base foot 28 supports the backing strip 20, and a locating dependent tab 29 fits in a recess 30 in the bottom part of the body 12. At the top of the backing strip 20 an opening 31 is provided to receive the lamp support portion of the alarm light assembly 22. The top cover 14 is hinged to the top of the backing strip 20, with spring clip 32 for securely holding the top cover in closed position, the spring clips fitting into the top of the front cover 13.

The indicia scale strip 17 is shown in its natural, unassembled, unbent form of a straight, flat, flexible strip. It is provided with a handling tab 33 at the top, with a hole therethrough for a handling or scale removal tool.

The transparent lens 21 has a straight, flat, rectangular front face shaped and dimensioned to fit in the opening 16 of the front cover 13. The rear of the lens 21 is provided with curved, rearward edges 34 which match, and in assembly are adjacent, the shoulders 27 of the body 12. The spaces between the body shoulders and the lens edges provides the curved channels which contain the edges of the backing strip 20 and also contain the edges of the scale strip 17, forming the strip 17 definitely, but lightly into the curvature necessary to accommodate the accurate movement of the pointer 18.

Figure 3:
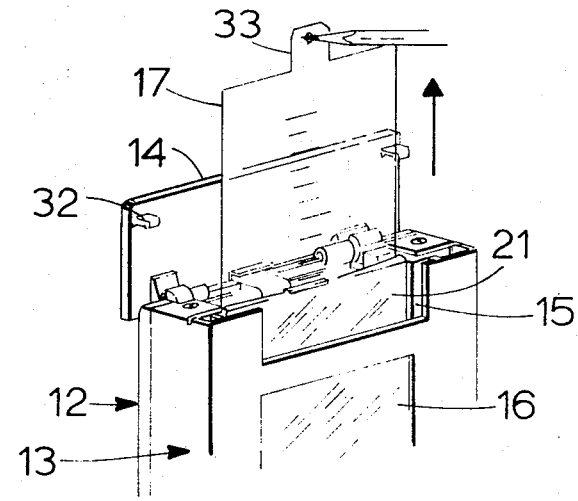
FIG. 3 is an illustration of indicator scale changing as accomplished with structure according to this invention.

In FIG. 3, the detail of the top of the unit is set forth, showing how the top 14 may be opened and the scale strip 17 removed.

Figure 4:
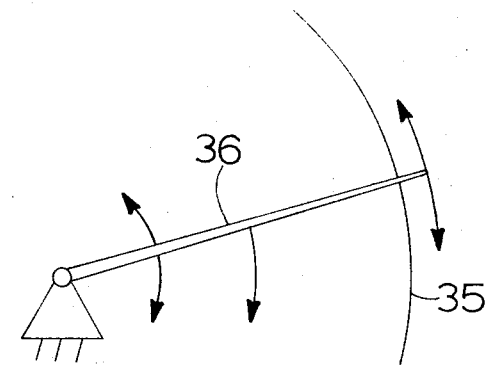
FIG. 4 is a schematic illustration of the curved form of an indicator scale when assembled in structure according to this invention, as compatible with the movement of a pivoted indicator arm.

In FIG. 4, the assembly curve of the indicator scale is represented by the curve 35, and the pivot line 36 represents an indicator pointer 36 as pivoted outside of the indicator unit.

Figure 5:
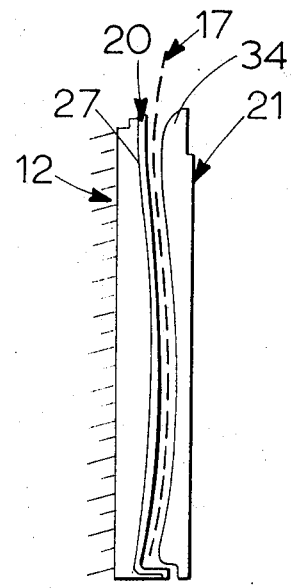
FIG. 5 is an edge view of an indicator scale as located inside the indicator or unit.

The assembled form of the indicator scale is illustrated in the cutaway showing of FIG. 5.

This invention therefore provides a new and useful instrument indicator assembly with special features of indicator scale interchangeability.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. An indicator assembly for use in industrial control instrumentation, said assembly comprising, in combination:

a vertically rectangular body, a front cover on said body, a viewing lens in said front cover, an indicator scale backing strip mounted in said body, a top cover mounted on the top of said backing strip, an alarm light assembly mounted on the top of said body and through said backing strip, and an indicator scale removably mounted between said backing strip and said viewing lens;

said body comprising a rectangular frame having a base, two uprights and a top crosspiece, wherein said base is provided with a central, front, open-top recess for receiving a portion of said backing plate, wherein each of said uprights is provided with a forwardly facing, vertically extending shoulder which is for the most part convex, wherein one of said uprights is provided with a vertically elongate passage from back to front of said body and between the said shoulder of said one of said uprights and the outer sidewall of said one of said uprights, and wherein said top crosspiece is provided with a central, vertical slot for mounting said alarm light assembly;

said front cover comprising a rectangular frame defining a central opening for receiving a portion of said viewing lens, sidewalls overlying said body uprights as side covering therefor, and an alarm light horizontal panel window across the top of said cover;

said indicator scale backing strip comprising a rectangular form shaped to fit in said body against said vertical shoulders of said body, said backing strip having a foot portion resting on the top of said body frame base and a central, depending toe extension of said foot portion resting in said open-top recess of said body frame base, said backing strip, further, having said top cover hingedly mounted on the top thereof for opening movement about an axis transversely across the top of said body and an alarm light assembly opening therethrough beneath said cover;

said alarm light assembly comprising a vertical support mounted in said slot in said body top crosspiece, and a forwardly extending portion through said opening therefor in said backing plate, whereby a light bulb may be mounted in said forwardly extending portion and in front of the top portion of said backing plate;

said viewing lens having rearwardly facing, vertically extending side shoulders each for the most part concave and together, with said convex shoulders in said body, and said backing plate thereon, forming a pair of curved, vertically disposed side channels for receiving said indicator scale; and said indicator scale comprising a flexible, normally flat strip which is side-edge mounted in said curved side channels between said body and backing plate and said viewing lens.